UNITED STATES PATENT OFFICE.

THOMAS GOULSTON GHISLIN, OF LONDON, ENGLAND.

IMPROVEMENT IN TREATING MARINE ALGÆ TO OBTAIN A MATERIAL FOR VENEERING, INLAYING, &c.

Specification forming part of Letters Patent No. 40,619, dated November 17, 1863.

*To all whom it may concern:*

Be it known that I, THOMAS GOULSTON GHISLIN, of London, England, have invented certain methods of preparing and treating algæ and other marine plants or vegetable substances, and of applying the products thereby obtained to various useful and ornamental purposes; and I do hereby declare that the following specification is a full and exact description of the same.

The object of this invention is the treatment of algæ and other marine vegetable substances, and in particular of those known as the *Ecklonia buccinalis, Laminaria buccinalis, Durillea utilis, Sarcophycus, Potatrium,* and other plants included under the generic title of "laminariæ."

I apply or propose to apply the above-named substances to the following uses, viz: veneering, coating, mounting, and inlaying on wood, metal, glass, papier-maché, or any other material to the manufacture of handles for cutlery, surgical instruments, and tools, whips, umbrellas, parasols, walking-sticks, pipes, tubes, acoustic and musical instruments, boxes, picture and other frames, medallions, book-covers, bijouterie and imitative objects of ornament and *vertu,* and a variety of other articles useful and ornamental.

In preparing the raw material for the purposes of my invention I cut off or remove all extraneous matters, and then immerse the substance in a hot lye of caustic lime for about three hours, and on removing it from the lime steep it in a bath of sulphuric acid diluted with about fifty times its weight of water. The substance may then be removed from the acid and placed in a solution of common soda, after which any mucilage or dirt that may adhere externally to the plant should be brushed away. After washing it for a time in pure water the prepared substance may be removed to the drying-room, and when half dry it can be shaped into any form desired. By opening out the tubular plant and laying it flat to dry under pressure it will be converted into sheets; or the plant, after being trimmed, may be steeped in a solution of American potash, then in diluted nitric acid, and afterward in spirits of naphtha, and when well brushed out in the naphtha it should be left to dry.

After the substance has been prepared in the manner above described it may be softened or rendered in some degree plastic by means of steam, and when in the softened state it can be molded into any desired shape; or the material may be steeped for about an hour and a half in a hot solution of common soda and applied, while hot, to prepared forms or molds, where it should be left to dry; or while in the molds it may be steeped for about three hours in a solution of nitrate of lead, and then left to dry. The prepared substance then contracts and adheres to the form or mold; or if the molds are made to take to pieces they can be removed and the prepared material will remain the shape of the mold.

Another mode of preparing the material is, after trimming, to steep it for about three hours in hot water or water rendered slightly alkaline. I then stamp, emboss, press, or pierce the whole or any portion of it, as may be required. When thus shaped it should be removed from the die-press and hardened by steeping for about an hour in a hot solution of nitrate of lead, and in some cases I afterward steep it in a hot solution of common alum or in sulphate of alumina.

Another mode consists in steeping the material (after carefully trimming and cleaning it) in a warm and very dilute solution of sulphuric acid, and after this I steep it for about three hours in a solution of corrosive sublimate, or in nitrate of lead, or in a hot solution of alum; or, if desired, two or more of these hardening solutions may be used in succession. In this state I also stamp, press, or pierce it, if required. It may then be left to dry, and subsequently steeped in a solution composed of spirits of wine, methylated spirit, or pyroxilic spirit, twenty parts; linseed-oil, twenty parts; resin, gum-thirsk, or asphaltum, twenty parts; turpentine, ten parts; shellac, five parts; sandarac, five parts. I then either press it flat or remove it to the drying-room, and when dry it is to be softened by steam, and then laid under pressure between sheets of warm iron, glass, or other material, taking care to protect the grain by blankets, flannel, or felt. It should then be stamped out with steel cutters or be left till quite dry and hard, after which it may be cut up and treated as ordinary horn, and converted into scales for knife-handles and cutlery purposes.

In the case of like marine vegetable productions as are not capable of being prepared by the methods already described, and also in order to utilize the waste pieces that result from cutting the prepared material into the required form, the material is reduced to a gelatinous mass, and used in this state for plastic purposes. To effect this object it is cut into small pieces, and then boiled, either in an open vessel or in a close vessel, under pressure, in plain water or water rendered alkaline, until the substance is rendered quite gelatinous. The superfluous liquid is then to be drained off, and the mass is hardened by running it through a solution of nitrate of lead. Sometimes the material may be steamed until reduced to a soft state, and then submitted to the action of a press in wooden or other molds or dies.

Another method of operating on the substance consists in reducing it to fine powder by grinding, and mixing the powder with a strong solution of glue containing alum and powdered rosin, and then amalgamate the whole till it arrives at the consistence of putty, or mixing the pulverized substance with coal-tar or a solution of bitumen or asphaltum in any suitable solvent. The mass may then be rolled out and submitted to pressure in molds or dies, as may be desired. The articles, when made of a mixture of coal tar or asphaltum, should be submitted to a baking process at from 300° to 500° of temperature in order to harden them.

Another method which I use is to dissolve gutta-percha and india-rubber with a solution of coal-tar in a large quantity of spirit, and then, adding this thin solution to the former, with the addition of black sulphur, I bake the whole in not more than 300° of heat, and afterward press or mold it, while hot, in any required form. The latter compositions, when molded, have the appearance of carved wood, and when dry should be brushed over with oil and polished by friction. I have given them the name of "laminite," while the other product, which is made without rendering the material plastic, I call "laminirian" horn.

I also extract the coloring-matter from the substance, and to give it an appearance like ivory by submitting it to the action, first, of a warm solution of caustic lime; secondly, of sulphurous acid; thirdly, of chloride of lime; and, fourthly, (if required,) of chlorine dissolved in water or in the form of gas. The bleaching operation may be repeated until a pure white is obtained, after which picric acid, mauve, magenta, and other dyes may be applied and various colors thereby imparted to the substance.

To produce a variegated brown, so desirable in imitating horn, the external surface of the substance should be rubbed off by means of rasps, scratch-brushes, emery-paper, or other appliances, and a varnish composed of shellac dissolved in spirit applied to the surface. Sometimes copal varnish or solutions of india-rubber or gutta-percha or other suitable combinations may be advantageously employed, and at other times gold or bronze powder, ultramarine-blue, or other pulverized coloring-matters may be applied; or the articles manufactured may be gilt or otherwise ornamented by means of galvanic deposits.

As to the strength of the acid solutions and other chemical agents used in the above process, I generally use dilute solutions containing from two to five per cent. of acid, and I continue the steeping for about six hours if the solutions are used cold and from two to three hours when used hot. No general rule, however, can be observed upon these points, as the proportions must always depend on the age, strength, and condition of the substances operated on. I do not therefore confine myself to any precise proportions or to any given time for the duration of the various operations.

Having now described my invention of certain methods of preparing and treating algæ and other marine plants or vegetable substances, and of applying the products thereby obtained to various useful and ornamental purposes—such as those for which horn, shell, whalebone, indurated leather, fish-skin, ivory, bone, hard woods, metals, compounds of india-rubber or gutta-percha, and other substances have been employed—I claim as my invention—

The preparation of marine plants, above referred to, and of other analogous vegetable productions, and also the application of the products thereby obtained by the methods hereinabove described and to the purposes hereinabove named, or by any similar methods, for any analogous purposes.

In testimony that the foregoing is a correct description of my said invention I have hereunto subscribed my name in the presence of two witnesses.

T. G. GHISLIN.

Witnesses:
E. F. LANGDALE,
G. W. YAPP.